(12) United States Patent
Lensing

(10) Patent No.: US 7,237,294 B2
(45) Date of Patent: Jul. 3, 2007

(54) TRI-FOLDING RAMP

(76) Inventor: Jerry P. Lensing, 517 S. 28th St., Van Buren, AR (US) 72956

( * ) Notice: Subject to any disclaimer, the term of this patent is extended or adjusted under 35 U.S.C. 154(b) by 226 days.

(21) Appl. No.: 11/004,557

(22) Filed: Dec. 3, 2004

(65) Prior Publication Data

US 2006/0117502 A1 Jun. 8, 2006

(51) Int. Cl.
*E01D 18/00* (2006.01)
*E01D 1/00* (2006.01)

(52) U.S. Cl. .......................... 14/69.5; 193/38
(58) Field of Classification Search .......... 14/69.5
See application file for complete search history.

(56) References Cited

U.S. PATENT DOCUMENTS

| 426,209 | A | 4/1890 | McIntyre | |
|---|---|---|---|---|
| 2,449,829 | A | 9/1948 | Agren | |
| 3,642,156 | A | 2/1972 | Stenson | |
| 3,818,528 | A | 6/1974 | Petersen | |
| D264,199 | S | 5/1982 | Wood | |
| 4,596,417 | A | 6/1986 | Bennett | |
| 4,864,672 | A | 9/1989 | Altieri et al. | |
| D338,760 | S | 8/1993 | Harrah | |
| 5,325,558 | A | 7/1994 | Labreche | |
| 5,768,733 | A * | 6/1998 | Kneebone | 14/69.5 |
| 5,933,898 | A * | 8/1999 | Estes et al. | 14/69.5 |
| 6,139,249 | A | 10/2000 | Lucht | |
| 6,267,082 | B1 | 7/2001 | Naragon et al. | |
| 6,463,613 | B1 * | 10/2002 | Thompson | 14/69.5 |
| 6,536,064 | B1 | 3/2003 | Swink et al. | |
| 6,643,878 | B2 | 11/2003 | Schmaltz et al. | |
| 7,082,637 | B1 * | 8/2006 | Griffin | 14/69.5 |
| 2004/0083562 | A1 * | 5/2004 | Leblanc | 14/69.5 |

* cited by examiner

*Primary Examiner*—Raymond Addie
(74) *Attorney, Agent, or Firm*—Boyd D. Cox

(57) ABSTRACT

The tri-folding ramp is a portable, collapsible device that includes three sections which define an upper surface of the ramp as having an arc-shaped profile. The arc-shaped profile of the ramp can reduce the loading angle between the distal end of the ramp and an upper loading surface, thereby inhibiting contact between the vehicle's undercarriage and the ramp's upper surface and/or the upper loading surface as the vehicle is entering or exiting the ramp.

21 Claims, 8 Drawing Sheets

TRI-FOLDING RAMP

BACKGROUND

The present invention is drawn to a tri-folding ramp for loading a vehicle or the like onto a loading surface. The tri-folding ramp comprises a plurality of sections which form a loading member. The loading member has an upper support surface which assumes an arc-shaped profile when the ramp is in an extended configuration. The arced profile deters contact between the ramp or loading surface and the undercarriage of a vehicle as the vehicle travels over the ramp and is loaded onto such loading surface. Furthermore, the tri-folding ramp is lightweight and collapsible into a collapsed configuration for storage and transport.

It is often desirable to haul a vehicle from one location to another. By placing the vehicle on the loading surface of a trailer or truck, the vehicle can be easily transported to the desired location and then unloaded for use. Lightweight vehicles can typically be lifted or lowered by hand onto the loading surface, but heavier vehicles such as lawnmowers, all terrain vehicles (ATVs), automobiles, trucks and motorcycles typically require other means to facilitate loading.

Ramps are commonly used for loading by providing a continuous span from one loading surface to another in order to facilitate loading and unloading various devices. A ramp is especially useful when moving a heavy device between two loading surfaces that are disposed at different heights. Typically the ramp is positioned with a first end resting on a lower surface and a second end resting on an upper surface. The device is then simply driven or pushed from the first loading surface, across the ramp and onto the second loading surface. However, one of the problems associated with using a ramp is the size of the loading angle that is created between the end of the ramp and the upper loading surface. A large loading angle can cause a vehicle, especially one with a low undercarriage to bottom out during loading or unloading. As the vehicle moves between the ramp and the loading surface, the vehicle's undercarriage can scrape the ramp or loading surface at or near the juncture of the ramp and loading surface. This can result in damage to the vehicle, the ramp, the loading surface or all three. Such damage can be costly and time-consuming to repair.

The loading angle between the end of the ramp and an upper loading surface can be reduced to avoid problems of scraping the vehicle's undercarriage. By increasing the length of the ramp, the sharpness of the angle between the ramp and upper loading surface is decreased. However, by increasing the ramp's length, the strength of the ramp is weakened, thereby decreasing its load-bearing ability. Furthermore, the weight and bulk of the ramp is increased, making the ramp more difficult to transport and install.

There is a need for a ramp that creates a low loading angle with the upper loading surface in order to deter contact between the undercarriage of the vehicle and the ramp or loading surface during the loading and unloading process. There is an additional need for a ramp that is lightweight, yet strong enough to support a heavy vehicle, such as a lawnmower, an ATV, a motorcycle, a car or a truck. In addition, a need exists for a ramp that is easy to store, transport and install.

SUMMARY

The present invention is drawn to a tri-folding ramp comprising three sections that are pivotally attached. The ramp, used for loading, includes a collapsed configuration and an extended configuration. In the extended configuration, the upper surface of the ramp comprises an arced profile. The tri-folding ramp further comprises means for supporting the ramp on a loading surface. Means for securing a loading member to a fixed support in order to maintain the loading member between first and second loading surfaces is also comprised by the ramp.

It is an object of the present invention to provide a ramp that can be extended for use and collapsed into a compact form for storage or transport.

It is a further object of the present invention to provide a ramp for loading of vehicles wherein the ramp deters scraping of the vehicle's undercarriage on the ramp or loading surface during loading and unloading.

It is a further object of the present invention to provide a tri-folding ramp that has an upper surface with an arced profile.

It is a further object of the present invention to provide a ramp which creates a small loading angle between the upper end of the ramp and the upper loading surface.

It is a further object of the present invention to provide a ramp comprising three independently pivotable sections that can be folded from an extended configuration into a collapsed configuration which is approximately one third of the length of its extended configuration.

Loading ramps facilitate moving a vehicle or other equipment from one loading surface to another loading surface. One loading surface can be located higher than the other loading surface. The ramp of the present invention is an elongated loading member with an upper surface which provides a pathway on which the vehicle is moved from one loading surface to another. To install, one end of the ramp is usually propped on the lower loading surface while the other end engages the upper loading surface. The loading angle between the upper loading surface and the ramp is a function of the ramp's length given a fixed height between the loading surfaces. The shorter the ramp, the sharper or greater the angle between the ramp and the upper loading surface. With a sharper loading angle, the vehicle will have a tendency to bottom out as it passes over the juncture between the ramp and upper loading surface. This can damage the vehicle, the ramp and/or the upper loading surface. In some instances such contact can force the ramp to pull away from the upper loading surface and fall to the ground, possible damaging the vehicle.

By providing an arced profile to the upper surface of the tri-folding ramp, the loading angle between the ramp and the upper loading surface is decreased without increasing the length of the ramp. Each of the three sections when the ramp is extended are disposed at an obtuse angle to the adjoining section (s), thereby creating an upper surface on the ramp that is not planar and each of the three sections extend in different planes. This arrangement decreases the loading angle between the ramp and the upper loading surface when the ramp is installed to thereby inhibit a vehicle from bottoming out when moving between the ramp and the loading surface.

DETAILED DESCRIPTION

Figure 1:
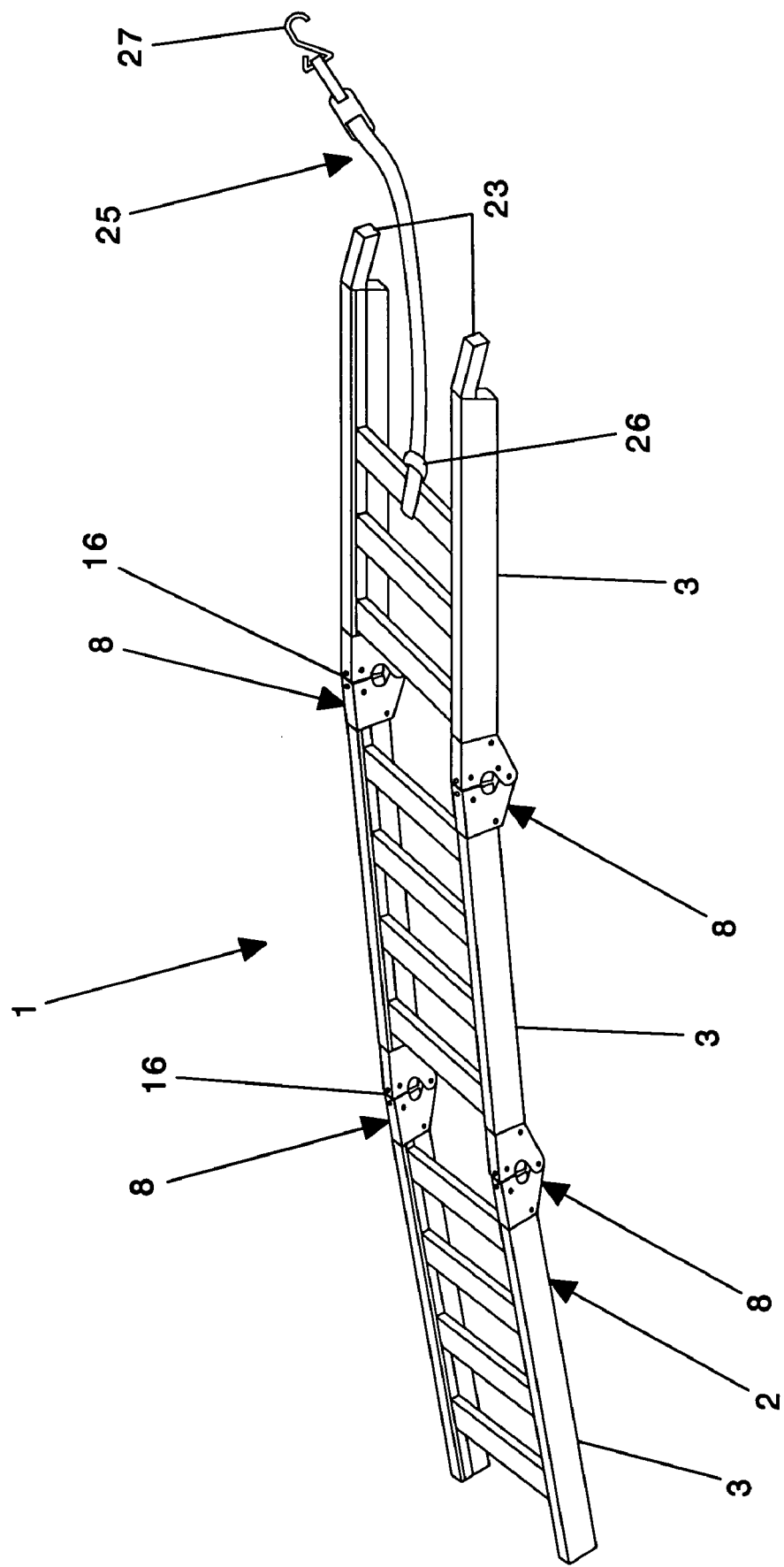
FIG. 1 is a perspective view of an embodiment of the tri-folding ramp of the present invention in the extended configuration.
Figure 2:
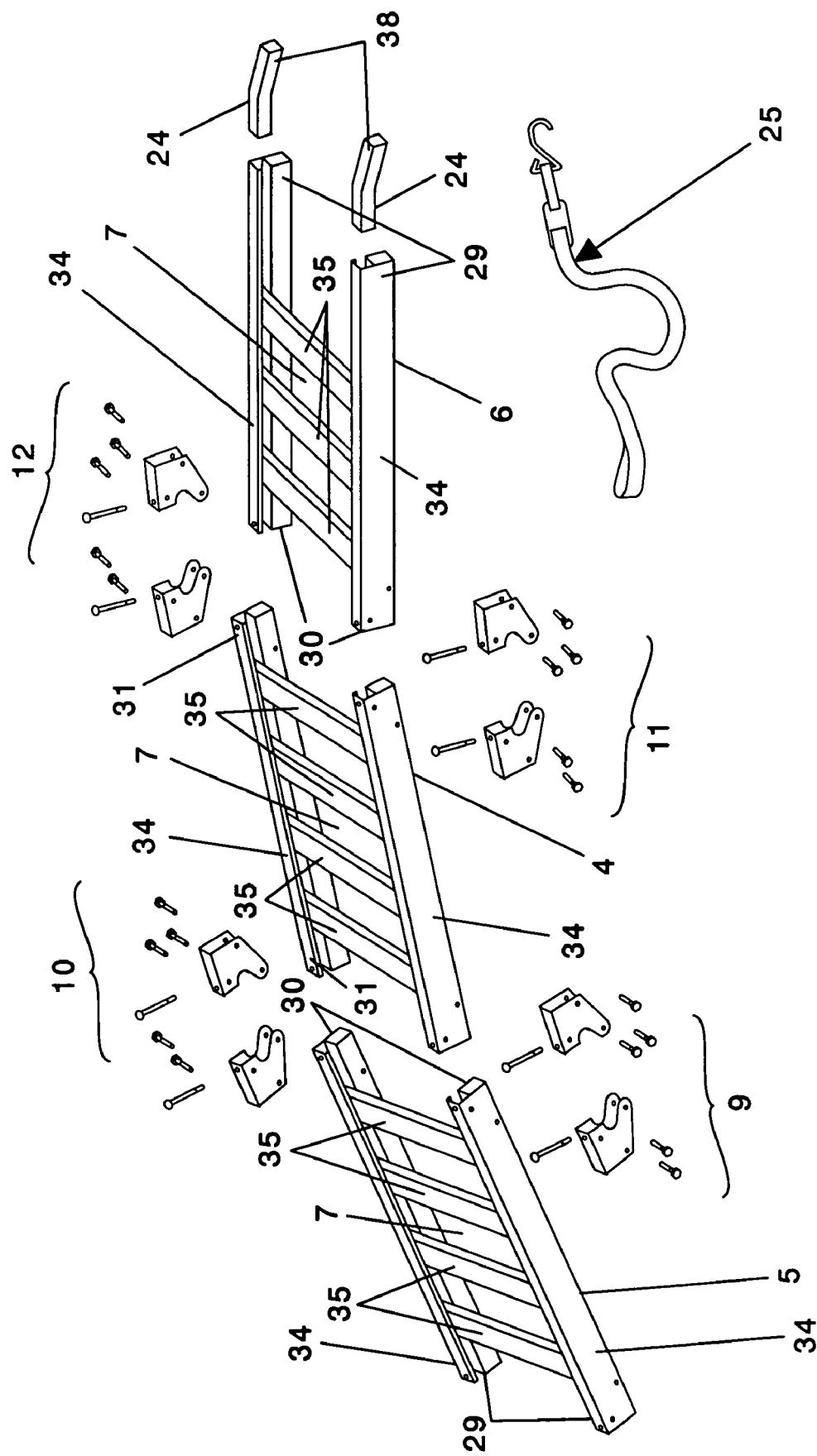
FIG. 2 is an exploded view of the tri-folding ramp of FIG. 1.
Figure 3:
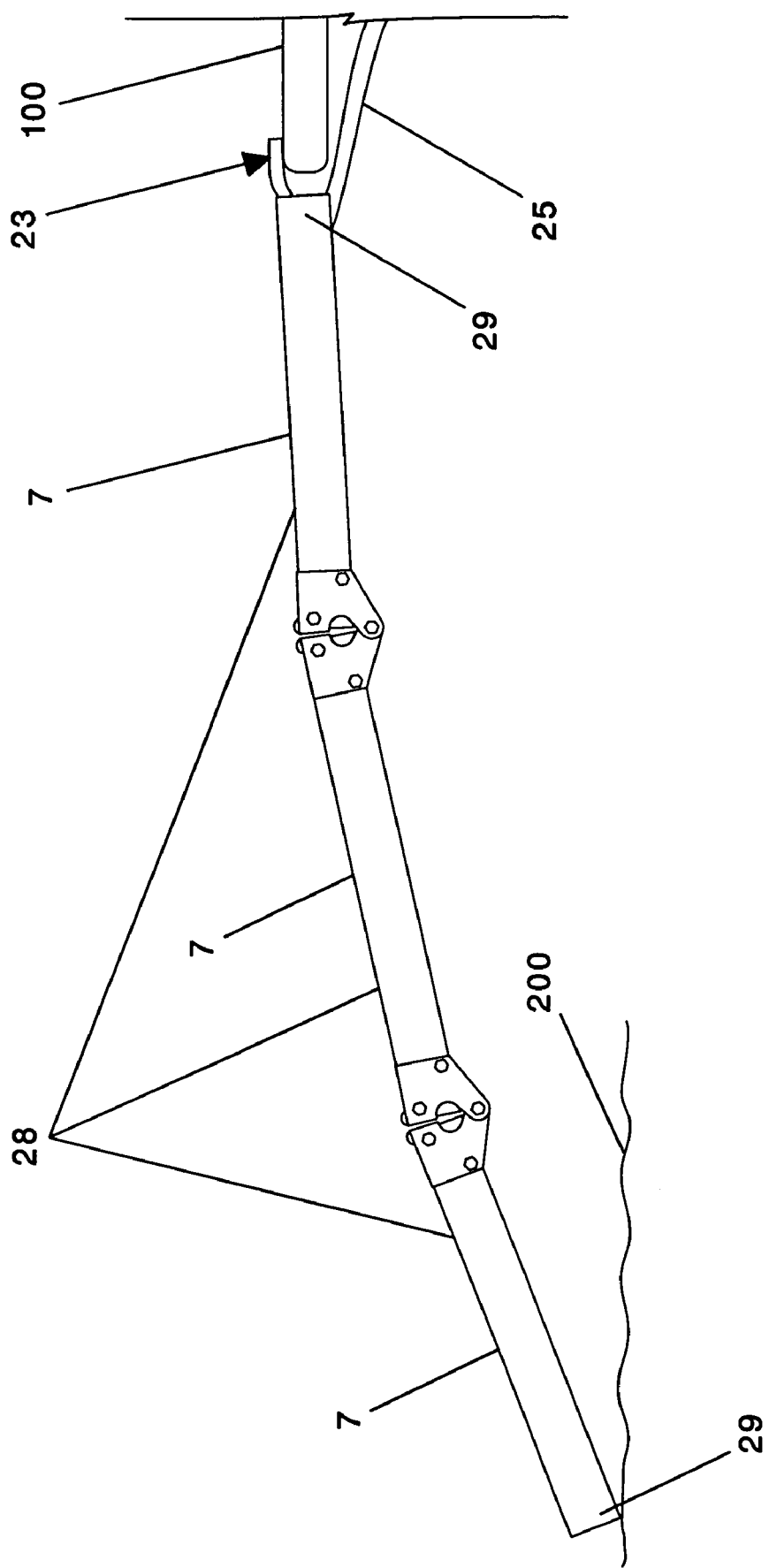
FIG. 3 is a side view of the tri-folding ramp of FIG. 1 in the extended configuration and positioned on an upper loading surface.

A preferred embodiment of the tri-folding ramp 1 of the present invention as shown in FIGS. 1–3 is adapted to extend between two loading surfaces. The two loading surfaces can be the same height or different heights. When using examples where the loading surfaces are positioned at different heights, reference is made herein to an upper loading surface 100 and a lower loading surface 200.

The ramp 1 comprises a loading member 2 and means for supporting the ramp. The loading member 2 comprises a plurality of sections 3. The sections 3 include a middle section 4, a first 5 and a second 6 end sections and means for attaching the sections. The ramp 1 also includes means for securing the loading member to a fixed support.

The first end section 5 includes a top surface 7. Likewise, the second end section 6 and the middle section 4 have respective top surfaces 7. The top surfaces 7 define a somewhat continuous upper surface 28 when the ramp 1 is in an extended configuration.

The means for attaching the sections comprises a plurality of hinges 8. The plurality of hinges 8 include first 9, second 10, third 11 and fourth 12 hinges. The first 9 and second 10 hinges are disposed between the first end section 5 and the middle section 4. The third 11 and fourth 12 hinges are disposed between the second end section 6 and the middle section 4. The first 9, second 10, third 11 and fourth 12 hinges generally comprise the same structure. The following description of the first hinge 9 is descriptive of each of the other second 10, third 11 and fourth 12 hinges.

Figure 4:
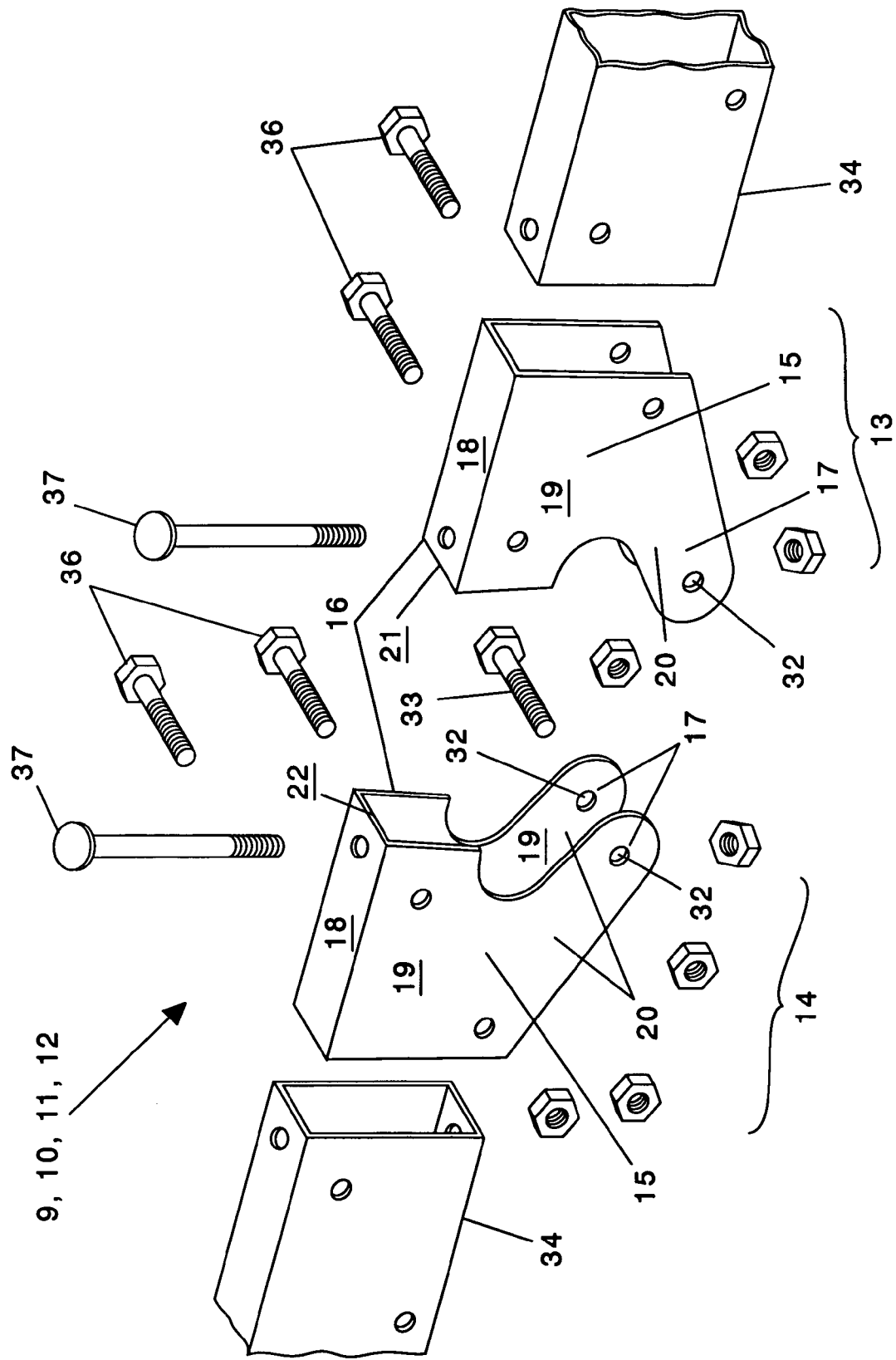
FIG. 4 is an exploded view of one of the hinges of the invention of FIG. 1.

Referring to FIG. 4, the hinge 9 comprises a first portion 13 and a second portion 14. Each of the first 13 and second 14 portions includes a stile engaging bracket 15, a limit stop 16, and a pivotal attachment portion 17. The stile engaging bracket 15 of each portion 13,14 is formed by a top wall 18 and two side walls 19. The pivotal attachment portion 17 of each portion 13,14 includes a pair of tabs 20. Each of the tabs 20 extends from a bottom edge of a respective side wall 19 of the stile engaging bracket 15. Each limit stop 16 includes first 21 and second 22 faces.

Means for supporting the ramp comprises a support bracket 23 as shown in FIGS. 1 and 2. The support bracket 23 is a pair of elongated curved members 24. The curved members 24 are adapted to rest on one of the loading surfaces when the ramp 1 is in use.

The means for securing the loading member to a fixed support is an adjustable strap 25. In a preferred embodiment, the adjustable strap 25 has a loop 26 at one end and a hook 27 disposed on the opposite end of the strap 25. Means for adjusting is disposed on the strap 25. The means for adjusting comprises a spring clip which enables the effective length of the strap 25 to be varied.

The first 13 and second 14 portions on each hinge 9,10,11,12 are generally U-shaped with the top wall 18 being flanked by the side walls 19. Each of the elongated curved members 24 have a rectangular cross section and a slight V-shaped side profile.

Preferably, the loading member 2 is made of aluminum which provides the ramp 1 with high strength and lightweight characteristics. Although the preferred embodiment is disclosed to comprise aluminum, other suitable materials including high strength plastics, wood, composites, and other metals could be used instead.

In a preferred use, the loading member 2 extends between the lower loading surface 200 and the upper loading surface 100. The upper surface 28 of the ramp 1 directly supports the vehicle as it moves across the ramp 1 from one loading surface to the other.

The hinges 8 pivotally attach the sections 3 together in a series. The limit stops 16 limit the outward pivoting of the sections 3. When the ramp 1 is unfolded the limit stops 16 hold the top surfaces 7 of each of the sections 4,5,6 in relatively fixed positions at predetermined angles to each other. In the preferred embodiment of FIG. 3, the predetermined angle between the top surfaces 7 of the first end section 5 and the middle section 4 and the predetermined angle between the top surfaces 7 of the second end section 6 and the middle section are of substantially equal magnitude.

Both of the first 5 and second 6 end sections are characterized by a distal end 29 and a proximal end 30. The middle section 4 has a pair of attaching ends 31 disposed opposite from each other. The proximal end 30 of the first end section 5 is attached to one of the attaching ends 31 of the middle section 4 by the first 9 and second 10 hinges. The proximal end 30 of the second end section 6 is attached to an opposite attaching end 31 of the middle section 4 by the third 11 and fourth 12 hinges. In addition, the support bracket 23 is fixedly attached to the distal end 29 of the second end section 6.

The tabs 20 in FIG. 4 are disposed on the first 13 and second 14 portions of each hinge 9,10,11,12. The tabs 20 of the first portion 13 overlap the tabs 20 of the second portion 14. The pivotal attachment portion 17 of each first 13 and second 14 portion further includes apertures 32 which extend through the overlapping tabs 20. A pivot pin 33 extends through the apertures 32 of the tabs 20 on each hinge 9,10,11,12 and defines a pivot point thereby allowing pivotal movement between the first 13 and second 14 portions of the respective hinge 9,10,11,12. That pivotal movement is imparted to the attached sections 4,5,6.

In a preferred embodiment shown in FIGS. 1, 2 and 4, the first end section 5 comprises a pair of stiles 34 and a plurality of transverse members 35. The transverse members 35 extend between the stiles 34. One side of the transverse members 35 define the top surface 7 of the first end section 5. Similarly, the second end section 6 and middle section 4 are each formed by a pair of stiles 34 and transverse members 35. One side of the transverse members 35 of the second end section 6 form the top surface 7 of the second end section 6 and one side of the transverse members 35 of the middle section 4 define the top surface 7 of the middle section 4.

The first end section 5 and middle section 4 are pivotally connected by the first 9 and second 10 hinges. The stile engaging brackets 15 of the first 9 and second 10 hinges are attached to respective stiles 34 of the first end section 5. The stile engaging brackets 15 of the second portions 14 of the first 9 and second 10 hinges are attached to the respective stiles 34 of one of the attaching ends 31 of the middle section 4.

Similarly, the stile engaging brackets 15 of the respective first portion 13 of each of the third 11 and fourth 12 hinges is attached to the respective stiles 34 of the second end section 6, while the stile engaging brackets 15 of the second portion 14 of each of the first 9 and second 10 hinges is attached to the respective stiles 34 of another of the attaching ends 6 of the middle section 4.

In a preferred embodiment, the top 18 and side 19 walls of each of the first 13 and second 14 portions partially surround the respective attached stile 34. A pair of side bolts 36 extend through the side walls 19 and stile 34 to secure each hinge 9,10,11,12 onto the respective attached stile 34. In addition, a single top bolt 37 extends through the top wall 18 of each stile engaging bracket 15 and the respective attached stile 34. Although bolts are used to secure the stile engaging brackets 15 to the stiles 34, other attachments including welds, rivets or adhesives could be used instead. Alternatively, the stile engaging brackets could be integral with the stiles.

The respective first 21 and second 22 faces of each first 9, second 10, third 11 and fourth 12 hinge are adapted to abut each other when the ramp 1 is in the extended configuration. A load positioned on the upper surface 28 of the ramp 1 creates a downward force on the loading member 2 which presses the first 21 and second 22 faces of each of the hinges 9,10,11,12 toward each other and engages the limit stops 16.

Figure 6:
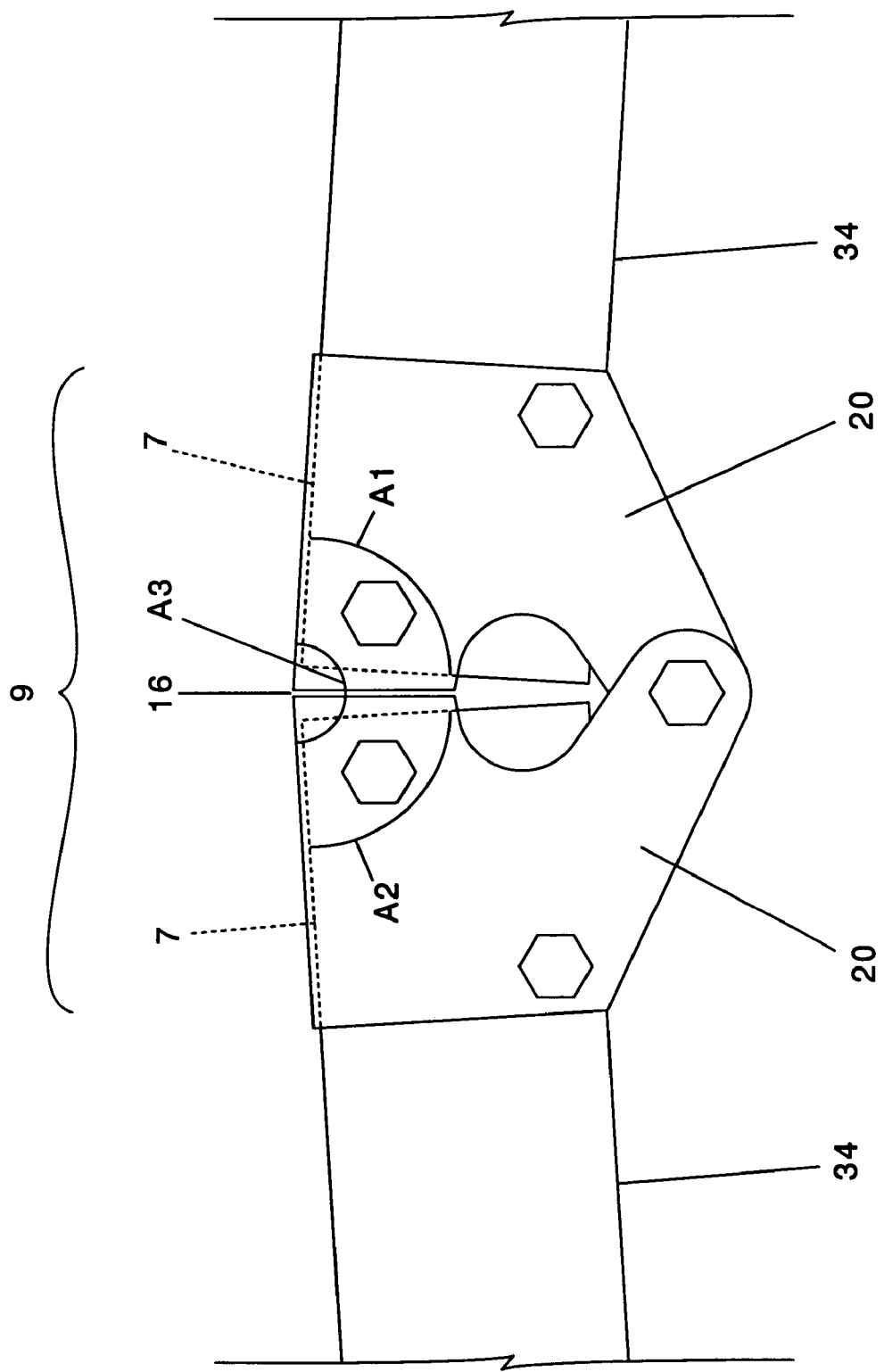
FIG. 6 is a side view of the hinge of FIG. 4.

When the first 21 and second 22 faces are abutting, the top surfaces 7 of two adjoined sections 4,5 and 5,6 are maintained at a predetermined angle as shown in FIGS. 4 and 6. The predetermined angle A3 between the top surfaces 4,5 and 5,6 of the two adjoined sections is obtuse. The magnitude of the predetermined angle A3 is a function of the limit stop 16 which is dictated by the angle at which the first 21 and second 22 faces of each of the hinges 9,10,11,12 abut one another relative to the top surface 7 of the respective section 4,5,6.

The included angle A1 between the first face 21 and the top surface 7 of the first section 5 is an acute angle being less than 90 degrees. Likewise, an included angle A2 between the second face 22 and the top surface 7 of the middle section 4 is less than 90 degrees.

On the third 11 and fourth 12 hinges, the first 21 and second 22 faces of the respective first 13 and second 14 portions are formed at an acute angle to the respective top surfaces 7 of the second end section 6 and the middle section 4.

With the ramp 1 in the extended configuration, the top surfaces 7 of the sections 4,5,6 are not coplanar. In addition, the upper surface 28 of the loading member 2 is non-planar and comprises an arc-shaped profile.

Figure 7:
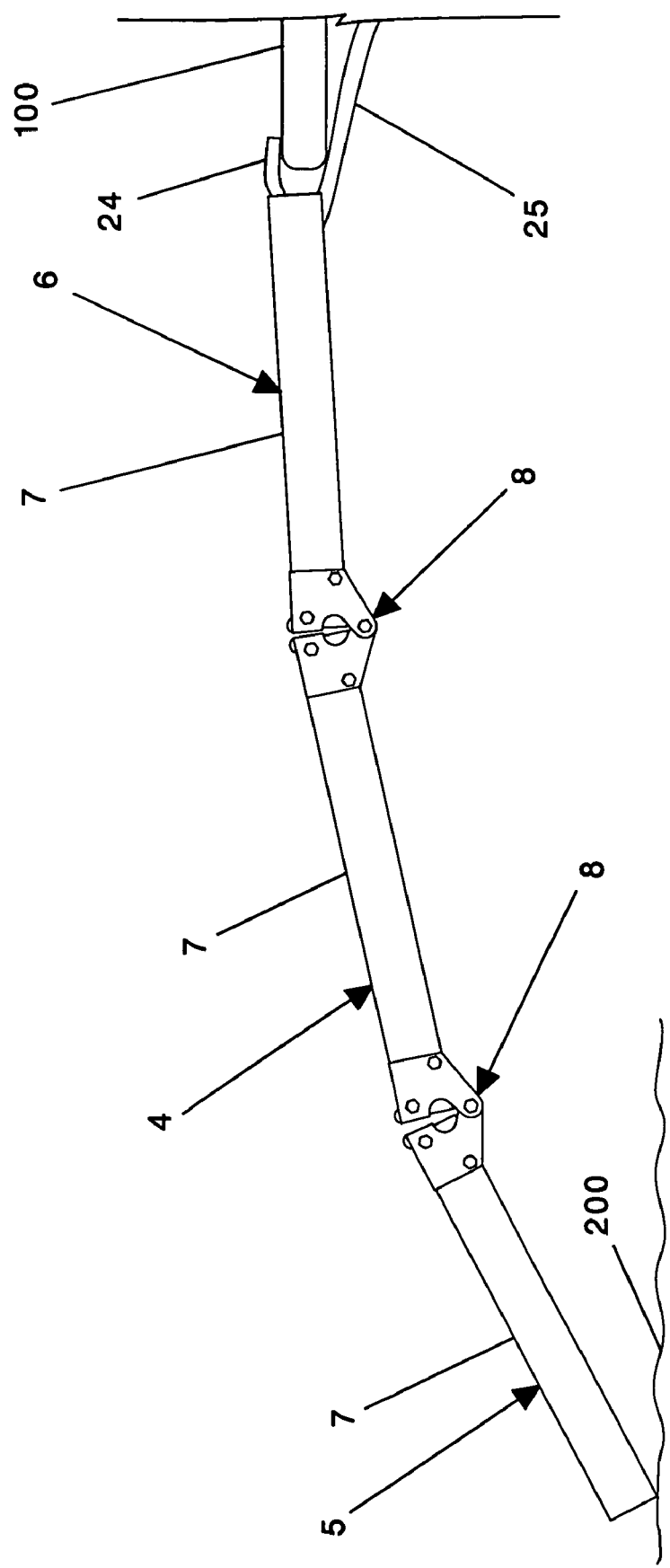
FIG. 7 is a side view of a second embodiment of the tri-folding ramp of the present invention in the extended configuration. The angle formed by the top surfaces of the middle section and the first end section is less than the angle formed by the top surfaces of the middle section and the second end section.
Figure 8:
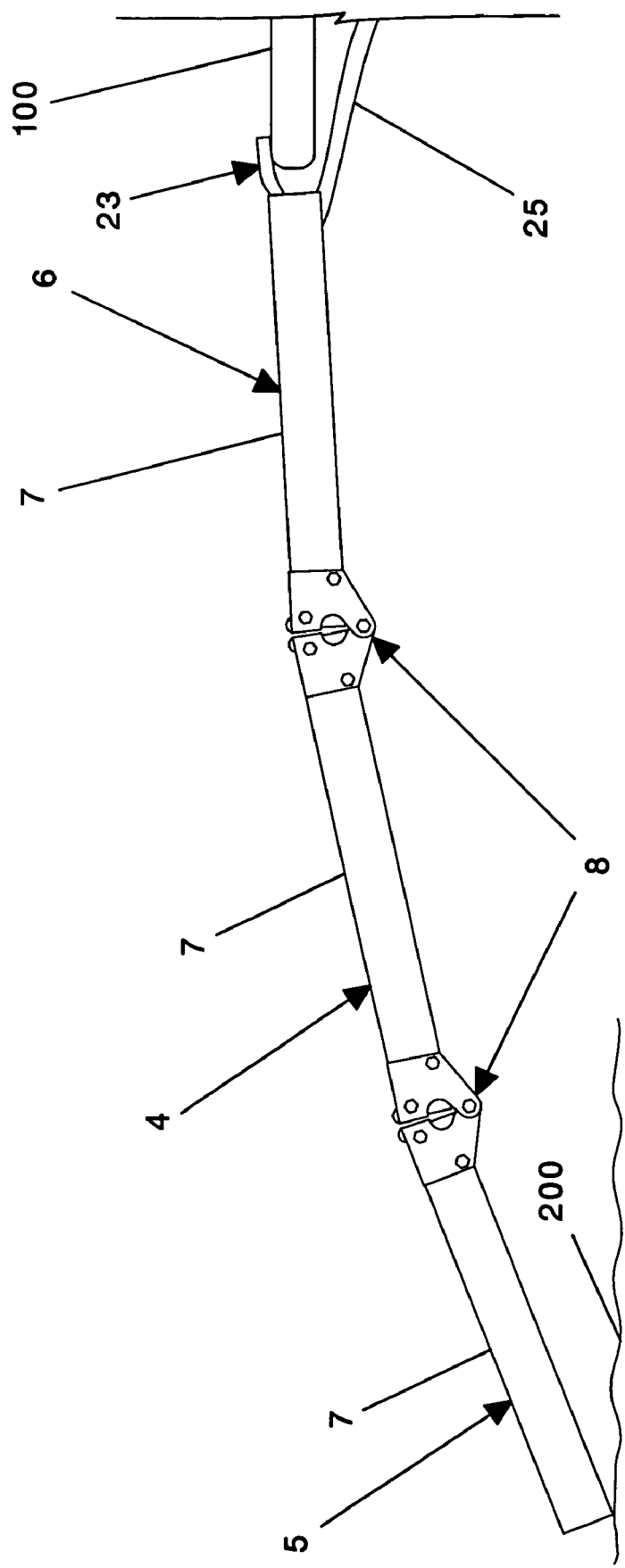
FIG. 8 is a side view of a third embodiment of the tri-folding ramp of the present invention in the extended configuration and positioned on an upper loading surface, wherein the angle formed by the top surfaces of the first end section and the middle section is greater than the angle formed by the top surfaces of the second end section and the middle section.

Although the predetermined angles in one preferred embodiment are approximately equal, the predetermined angles may be of different magnitudes. For example, in a second embodiment shown in FIG. 7, the predetermined angle formed between the top surfaces of the middle section 4 and the first end section 5 is smaller than the predetermined angle formed between the top surfaces of the middle section 4 and the second end section 6 when the ramp is fully extended. Alternatively, in a third embodiment shown in FIG. 8, the predetermined angle between the top surfaces of the first end section 7 and the middle section 4 is greater than the angle formed between the top surfaces 7 of the middle section 4 and the second end section 7 when the ramp is in the extended configuration.

The pair of elongated curved members 24 are disposed on the distal end 29 of the second end section 6. Each of the elongated curved members 24 is attached to a respective one of the stiles 34 of the second end section 6. Both of the elongated curved members 24 have a free end 38 that extends outwardly beyond the second end section 6. The free ends 38 are adapted to engage the upper loading surface 100 when the ramp 1 is installed.

The adjustable strap 25 is looped around at least one of the transverse members 35 and secured to a fixed support, such as the upper loading surface 100 upon installation.

Preferably, the first 5 and second 6 sections including the support bracket 23 are approximately the same length. The middle section 4 is at least as long or longer than either of the first 5 and second 6 end sections.

Figure 5:
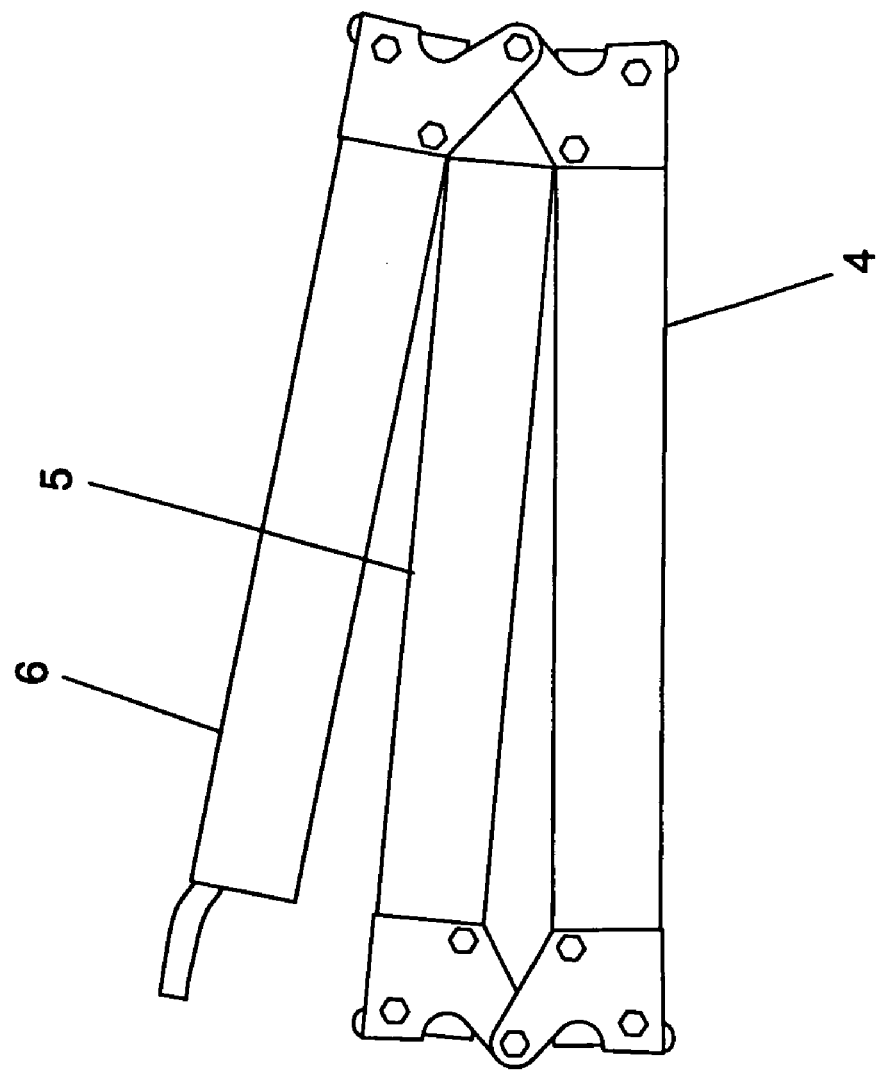
FIG. 5 is a perspective view of the tri-folding ramp of FIG. 1 in a collapsed configuration.

The ramp 1 comprises a collapsed configuration and an extended configuration. The collapsed configuration as shown in FIG. 5 is characterized by the first 5 and second 6 end sections being folded across the middle section 4. In this configuration, the ramp 1 is in a compact form whereby the ramp's effective length is shorter than the length of the ramp when extended. The adjustable strap 25 can be looped around the folded sections 4,5,6 and secured to hold the ramp 1 in the collapsed configuration. Due to the compactness of the loading member 2 when folded, the ramp 1 can be more easily stored and transported.

The extended configuration is shown in FIGS. 1 and 3 in which the first 5 and second 6 end sections are folded out and away from the middle section 4. In this configuration the limit stops 16 of the first 9 and second 10 hinges and the limit stops 16 of the third 11 and fourth 12 hinges are engaged. The first 21 and second 22 faces of the limit stop 16 on each pair of hinges 9,10 and 11,12 are proximate or abutting when the ramp 1 is in the extended configuration. The top surface 7 of the first end section 5 is disposed at an angle to the top surface 7 of the middle section 4. Likewise, the top surface 7 of the second end section 6 is disposed at an angle to the top surface 7 of the middle section 4 such that the top surfaces 7 of the first 5 and second 6 end sections extend angularly away from the top surface 7 of the middle section 4.

The upper surface 28 of the loading member 2 has an arc-shaped profile. Consequently, the upper surface 28 formed by the top surfaces 7 of the first end section 5, the middle section 4 and the second end section 6 is not planar when the ramp 1 is disposed in the extended configuration. The magnitude of angle A3 formed between the top surfaces 7 of the first end section 5 and the middle section 4 and the magnitude of angle A3 formed between the top surfaces 7 of the second end section 6 and the middle section 4 are predetermined and maintained by the limit stops 16 on the hinges 9,10,11,12. Each of the first 21 and second 22 faces is disposed at an angle of less than 90 degrees relative to the top surface 7 of the respective section 4,5,6.

The first 21 and second 22 faces of each respective hinge 9,10,11,12 are proximate to and/or abutting each other when the ramp 1 is in the extended configuration. Conversely, when the ramp 1 is in the collapsed configuration, the first 21 and second 22 faces are spaced away from each other and are not abutting.

The upper surface 28 of the ramp 1 is directed upwardly during use. The distal end 29 of the first end section 5 rests on the lower loading surface 200 while the elongated curved members 24 on the second end section 6 are engaged with the upper loading surface 100.

To install the tri-folding ramp 1 of the present invention, the loading member 2 is transformed from the collapsed configuration into the extended configuration and positioned to extend from the upper support surface 100 to the lower support surface 200. The means for securing the loading member is engaged with a fixed support.

To unfold the ramp 1 from the collapsed configuration to the extended configuration, the second end section 6 is pivoted outwardly and away from the underlying first end section 5 and middle section 4 until the first 21 and second 22 faces of the hinges 9,10,11,12 are proximate and/or abut each other. The first end section 5 is then pivoted outwardly and away from the middle section 4, until the limit stop 16 of the first 9 and second 10 hinges deter further pivotal movement therebetween.

With the ramp 1 in the extended configuration the support bracket 23 is placed on the upper loading surface 100 with the lower sides of the elongated curved members 24 resting on the upper loading surface 100. The distal end 29 of the first end section 5 is placed on the lower loading surface 200.

The adjustable strap 25 is attached to at least one of the transverse members 35 and may be secured to a fixed support by looping the strap 25 around the fixed support and securing the hook 27 thereto, or by directly securing the hook 27 to the fixed support.

The tri-folding ramp of the present invention is a strong, lightweight device used to assist in moving vehicles from one loading surface to another. In use, the ramp inhibits the vehicle from bottoming out or scraping its undercarriage as the vehicle is moved across the ramp and onto a loading surface or vice versa. In addition, the ramp can be folded from an in-use, extended configuration into a collapsed configuration that is convenient for storage. In the collapsed configuration, the ramp can be easily carried along with the transported vehicle to facilitate loading and unloading at different locations.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A tri-folding ramp comprises:
   a loading member comprising a collapsed configuration and an extended configuration;
   a support bracket on the loading member for supporting an end of the loading member on a surface;
   said loading member further comprises a first end section, a second end section, a middle section and a plurality of hinges;
   wherein said first end section is pivotally attached to said middle section by at least one of said plurality of hinges, and said second end section is attached to the middle section by at least one of said plurality of hinges;
   said middle section comprising a pair of stiles and at least one transverse member extending between the stiles;
   the first end section comprising a pair of stiles and at least one transverse member extending between the stiles;
   the second end section comprising a pair of stiles and at least one transverse member extending between the stiles;
   each of said hinges comprising a pivot point;
   each of said first end section, said second end section and said middle section having a top surface; and
   the pivot point of said at least one hinge attaching the first end section and the middle section is offset from said stiles and said transverse members of said first end section and said middle section, wherein said pivot point is positioned a distance from lower edges of the stiles of each of said sections in a direction directly opposite the top surface of the loading member and is disposed on a side of said loading member opposite the top surface; and
   the pivot point of said at least one hinge attaching the second end section and the middle section is offset from said stiles and transverse members of said second end section and said middle section, wherein said pivot point is positioned a distance from lower edges of the stiles of each of said sections in a direction directly opposite the top surface of the loading member and is disposed on a side of said loading member opposite the top surface.

2. The tri-folding ramp of claim 1, wherein each of said hinges further comprises first and second portions and a limit stop, said limit stop includes a first face disposed on said first portion and a second face disposed on said second portion, wherein when said loading member is in the collapsed configuration said first and second faces of each respective one of said hinges are spaced apart and when said loading member is in the extended configuration said first and second faces of each respective one of said hinges are abutting.

3. The tri-folding ramp of claim 1, wherein in the extended configuration, the top surfaces of the first end section, the middle section and the second end section form a continuous upper surface having a generally arc-shaped profile; and said predetermined angles are obtuse angles.

4. The tri-folding ramp of claim 3, wherein the top surface of the first end section and the top surface of the middle section extend from each other at a predetermined angle; and the top surface of the second end section and the top surface of the middle section extend away from each other at a predetermined angle.

5. The tri-folding ramp of claim 4, wherein said at least one hinge attaching said first end section and said middle section comprises first and second hinges, and said at least one hinge attaching said second end section and said middle section comprises third and fourth hinges.

6. The tri-folding ramp of claim 1, wherein said support bracket further comprises a pair of elongated curved members having a general V-shape.

7. The tri-folding ramp of claim 6,
   wherein each of said pair of elongated curved members has a free end and an opposite end, said opposite end fixedly attached to a distal end of said second end section, and said free end extending outwardly from the second end section and further extending angularly away from the top surface of said second end section.

8. The tri-folding ramp of claim 1, further comprising an adjustable strap for securing the loading member to a fixed support.

9. The tri-folding ramp of claim 1, wherein in the collapsed configuration, said first end section directly overlays a bottom surface of said middle section and said second end section directly overlays the top surface of said first end section.

10. The tri-folding ramp of claim 1, wherein said at least one hinge attaching said first end section and said middle section comprises a pair of hinges including first and second hinges, and said at least one hinge attaching said second end section and said middle section comprises a pair of hinges including third and fourth hinges.

11. The tri-folding ramp of claim 10, wherein said first hinge is mounted on one of said stiles of the first end section and one of said stiles of the middle section and said second hinge is mounted on another stile of the first end section and on another of said stiles of the middle section, and
said third hinge is mounted on one of said stiles of the second end section and one of said stiles of the middle section and said fourth hinge is mounted on another stile of the second end section and another of said stiles of the middle section.

12. A tri-folding ramp comprises:
a loading member comprising a collapsed configuration and an extended configuration;
a support bracket on the loading member for supporting an end of the loading member on a surface;
said loading member further comprises a first end section, a second end section, a middle section and a plurality of hinges;
wherein said first end section is pivotally attached to said middle section by at least one of said plurality of hinges, and said second end section is attached to the middle section by at least one of said plurality of hinges;
said middle section comprising a pair of stiles and at least one transverse member extending between the stiles;
the first end section comprising a pair of stiles and at least one transverse member extending between the stiles;
the second end section comprising a pair of stiles and at least one transverse member extending between the stiles;
each of said hinges comprising a pivot point;
each of said first end section, said second end section and said middle section having a top surface; and
wherein in said collapsed configuration, said first end section is adjacent to and directly overlays a bottom surface of said middle section, and said second end section is adjacent to and directly overlays the top surface of said first end section.

13. The tri-folding ramp of claim 12, wherein each of said first, second, third and fourth hinges further comprises first and second portions and a limit stop, said limit stop includes a first face disposed on said first portion and a second face disposed on a second portion;
wherein when said loading member is in the collapsed configuration, said first and second faces of each respective one of said first, second, third and fourth hinges are spaced apart and when said loading member is in the extended configuration said first and second faces of each respective hinge are abutting.

14. The tri-folding ramp of claim 13, wherein the top surface of the first end section and the top surface of the middle section extend at a predetermined angle from each other; the top surface of the second end section and the top surface of the middle section extend at a predetermined angle away from each other; and
said predetermined angles are obtuse angles.

15. The tri-folding ramp of claim 14, wherein in the extended configuration, the top surfaces of the first end section, the middle section and the second end section form a continuous upper surface having a generally arc-shaped profile.

16. The tri-folding ramp of claim 12, wherein said support bracket is generally V-shape;
said support bracket having at one end thereof attached to the second end section and having another end extending angularly away from the top surface of the second end section.

17. The tri-folding ramp of claim 12, further comprising means for securing the loading member to a fixed support.

18. A tri-folding ramp comprises:
a loading member comprising a collapsed configuration and an extended configuration; and
a pair of elongated curved members for supporting the ramp on an upper loading surface;
said loading member comprises first and second end sections, a middle section and first, second, third and fourth hinges;
wherein each of said middle section, said first end section and second end section comprises a pair of stiles and a plurality of transverse members extending between the stiles;
said first end section having a top surface, a proximal end and a distal end, wherein said top surface is generally planar;
said second end section having a top surface, a proximal end and a distal end, wherein said top surface is generally planar;
said middle section having a top surface and first and second attaching ends, wherein said top surface is generally planar;
wherein said proximal end of the first end section is attached to one of said attaching ends of the middle section by said first and second hinges, and said proximal end of said second end section is attached to an other of said attaching ends of the middle section by said third and fourth hinges;
said first hinge comprises first and second portions and a limit stop;
said second hinge comprises first and second portions and a limit stop;
said third hinge comprises first and second portions and a limit stop;
said fourth binge comprises first and second portions and a limit stop;
each of said first portions comprises a stile engaging bracket, a first face and a pivotal attachment portion;
said stile engaging bracket of each of the first portions comprises a top wall and side walls;
said pivotal attachment portion of each of the first portions comprises a pair of tabs and an aperture in each tab;
each of said second portions comprises a stile engaging bracket, a second face, and a pivotal attachment portion;
said stile engaging bracket of each of the second portions comprises a top wall and side walls;
said pivotal attachment portion of each of the second portions comprises a pair of tabs, an aperture in each tab;
wherein each of the tabs on the respective first portion of the first, second, third and fourth hinges are adjacent to a tab on the respective second portion and the apertures are aligned; a pivot pin extending through the apertures of each respective first, second, third and fourth hinge pivotally adjoins each of said first and respective second portions together;

wherein each of said stile engaging brackets is attached to a respective stile, each of the pivotal attachment portions is disposed on a side of the respective section opposite the respective top surface and said pivot pin of the respective pivotal attachment portion is spaced away from said stile in a direction directly opposite said top surface;

said limit stop of each hinge includes the first face of said first portion and said second face of said second portion, wherein when said loading member is in the extended configuration, said first and second faces of each respective one of said hinges abut and when said loading member is in the collapsed configuration, said first and second faces of each respective one of said hinges are spaced apart;

wherein in said extended configuration, the top surface of the first end section, the top surface of the middle section and the top surface of the second end section form a continuous upper surface, such that the top surface of the first end section and the top surface of the middle section extend from each other at a predetermined angle and the top surface of the second end section and the top surface of the middle section extend from each other at a predetermined angle;

said predetermined angles are obtuse angles and said upper surface of the loading member comprises a generally arc-shaped profile;

wherein each of said first faces of the first and second hinges extend at an acute angle to the top surface of the first end section, each of said second faces on the first, second, third and fourth hinges extend at an acute angle to the top surface of the middle section, and each of said first faces on the third and fourth hinges extend at an acute angle to the top surface of the second end section;

said pair of elongated curved members having a general V-shape, each of said elongated curved members has a free end and an opposite end, said opposite end being fixedly attached to the distal end of said second end section, each of said free ends extending outwardly from the second end section and extending at an angle away from the top surface of the second end section; and wherein in the collapsed configuration, said first end section is adjacent to and directly overlays a bottom surface of said middle section and said second end section is adjacent to and directly overlays the top surface of said first end section.

19. The tri-folding ramp of claim 18, further comprising an adjustable strap attached to at least one transverse member of the loading member.

20. The tri-folding ramp of claim 18, wherein said loading member and elongated curved members are aluminum.

21. A tri-folding ramp comprises:
a loading member comprising a collapsed configuration and an extended configuration;
a support bracket on the loading member for supporting an end of the loading member on a surface;
said loading member further comprises a first end section, a second end section, a middle section and a plurality of hinges;
wherein said support bracket comprises a pair of elongated curved members, each of said elongated curve members having a general V-shape, a free end and an opposite end, said opposite end fixedly attached to a distal end of said second end section, and said free end extending outwardly from the second end section and further extending angularly away from the top surface of said second end section;
wherein said first end section is pivotally attached to said middle section by at least one of said plurality of hinges, and said second end section is attached to the middle section by at least one of said plurality of hinges;
said middle section comprising a pair of stiles and at least one transverse member extending between the stiles;
the first end section comprising a pair of stiles and at least one transverse member extending between the stiles;
the second end section comprising a pair of stiles and at least one transverse member extending between the stiles;
each of said hinges comprising a pivot point;
each of said first end section, said second end section and said middle section having a top surface; and
the pivot point of said at least one hinge attaching the first end section and the middle section is offset from said stiles and said transverse members of said first end section and said middle section, wherein said pivot point is disposed on a side of each of said sections opposite from the respective top surface; and
the pivot point of said at least one hinge attaching the second end section and the middle section is offset from said stiles and transverse members of said second end section and said middle section, wherein said pivot point is disposed on a side of each of said sections opposite the from the respective top surface.

* * * * *